US012479620B2

(12) United States Patent
Bawden

(10) Patent No.: US 12,479,620 B2
(45) Date of Patent: Nov. 25, 2025

(54) LOW VOLUME, HIGHLY ADJUSTABLE PACKAGING AND STORAGE SOLUTIONS

(71) Applicant: Lineworks, LLC, Bountiful, UT (US)

(72) Inventor: Samuel J. Bawden, Bountiful, UT (US)

(73) Assignee: Lineworks, LLC, Bountiful, UT (US)

( * ) Notice: Subject to any disclaimer, the term of this patent is extended or adjusted under 35 U.S.C. 154(b) by 127 days.

(21) Appl. No.: 18/199,751

(22) Filed: May 19, 2023

(65) Prior Publication Data

US 2023/0373679 A1 Nov. 23, 2023

Related U.S. Application Data

(63) Continuation of application No. PCT/US2021/060375, filed on Nov. 22, 2021.

(60) Provisional application No. 63/145,139, filed on Feb. 3, 2021, provisional application No. 63/116,350, filed on Nov. 20, 2020.

(51) Int. Cl.

| | |
|---|---|
| ***B65D 5/20*** | (2006.01) |
| ***B31B 50/26*** | (2017.01) |
| ***B31B 50/62*** | (2017.01) |
| ***B65D 5/355*** | (2006.01) |
| ***B65D 5/42*** | (2006.01) |
| ***B65D 5/54*** | (2006.01) |
| ***B65D 85/64*** | (2006.01) |

(52) U.S. Cl.

CPC ............ *B65D 5/0005* (2013.01); *B31B 50/26* (2017.08); *B31B 50/62* (2017.08); *B65D 5/2047* (2013.01); *B65D 5/425* (2013.01); *B65D 5/548* (2013.01); *B65D 85/64* (2013.01); *B65D 2585/649* (2013.01)

(58) Field of Classification Search

CPC .... B65D 5/0005; B65D 5/2047; B65D 5/425; B65D 5/548; B65D 85/64; B65D 2585/649; B65D 5/20; B31B 50/62; B31B 50/26

USPC ...... 206/315.1, 315.11, 784, 816; 229/103.2, 229/103.3, 87.03, 87.05

See application file for complete search history.

(56) References Cited

U.S. PATENT DOCUMENTS 1,125,535 A * 1/1915 Hoffman .............. B65D 5/0005 229/101
2,917,166 A * 12/1959 Lidgard ................. B65D 85/48 206/448
3,203,618 A * 8/1965 Andrews ............ B65D 75/5844 D9/713

(Continued)

FOREIGN PATENT DOCUMENTS

DE 8628554 U1 1/1987
JP 2019108133 A 7/2019

*Primary Examiner* — Jacob K Ackun
(74) *Attorney, Agent, or Firm* — Elevated IP, LLC

(57) ABSTRACT

The present disclosure provides low volume, highly adjustable packaging that reduces surface area by 25% and overall material by 60% compared with standard boxes. In some embodiments, the presence of a telescoping sleeve, that is slightly wider than and slides over a mating sleeve, allows the length of the packaging to be adjusted. These volume and length reductions save approximately two-thirds of shipping costs. Further, in some embodiments, strategically placed scoring allows the packaging to flex and contour to the shape of a three-dimensional object to be placed in the packaging. In addition, reinforced corners protect contents of the package, and, in some embodiments, portions of the packaging are designed to be repurposed as artwork.

20 Claims, 13 Drawing Sheets

(56) References Cited

U.S. PATENT DOCUMENTS

| | | | | | |
|---|---|---|---|---|---|
| 3,455,499 | A | | 7/1969 | Anderson | |
| 4,483,380 | A | * | 11/1984 | Beran | A45C 3/00 206/523 |
| 4,823,954 | A | * | 4/1989 | Chevalier | B65D 75/14 206/424 |
| 5,803,250 | A | * | 9/1998 | Mori | G11B 33/0405 |
| 10,661,864 | B2 | | 5/2020 | Warll | |
| 2007/0125671 | A1 | | 6/2007 | Stephens | |
| 2010/0025271 | A1 | * | 2/2010 | Boyles | F41C 33/06 224/582 |
| 2018/0208352 | A1 | | 7/2018 | Ishida | |

* cited by examiner

LOW VOLUME, HIGHLY ADJUSTABLE PACKAGING AND STORAGE SOLUTIONS

CROSS-REFERENCE TO RELATED APPLICATIONS

This application is a continuation under 35 U.S.C. 111 of International Patent Application No. PCT/US2021/060375, filed Nov. 22, 2021, which claims the benefit of and priority to U.S. Provisional Patent Application No. 63/116,350, filed Nov. 20, 2020, and 63/145,139, filed Feb. 3, 2021, each of which is hereby incorporated by reference in its entirety.

BACKGROUND

About 165 billion packages are shipped in the U.S. each year, with cardboard use roughly equating to more than 1 billion trees. Much of that packaging ends up in landfills and oceans, contributing to environmental harm. As more people choose to shop online instead of shopping at retail stores, the environmental harm caused by excessive packaging will continue to rise. Many individuals do not have access to recycling centers or chose not to recycle, which also adds to the excessive packaging waste.

SUMMARY

The present disclosure provides low volume, highly adjustable packaging that, in some embodiments, reduces surface area by 25% and overall material by 60% compared with standard boxes. In some embodiments, the presence of a telescoping sleeve, that is slightly wider than and slides over a mating sleeve, allows the length of the packaging to be adjusted to accommodate content of different sizes. The volume and length reductions save approximately two-thirds of shipping costs. Further, in some embodiments, strategically placed scoring allows the packaging to flex and contour to the shape of a three-dimensional object to be placed in the packaging. For example, a snowboard mailer may flex at both top and bottom ends of the packaging to accommodate the curvature of the snowboard tip and tail. In addition, reinforced corners protect contents of the package, and, in some embodiments, portions of the packaging are designed to be repurposed as artwork.

In an aspect, packaging comprises a material shaped and creased to form a main panel, a first back panel, a second back panel, and a bottom flap, wherein the first back panel and the second back panel fold toward one another and join to form a solid back panel, the bottom flap folds over and adheres to the solid back panel such that the packaging creates a sleeve having an open end and a substantially closed end, and a surface of the main panel comprises a plurality of scoring marks near the closed end, each of the scoring marks partially penetrating a thickness of the main panel.

In an embodiment, the scoring marks of the packaging partially penetrate an interior surface of the main panel, an exterior surface of the main panel, or both the interior surface and the exterior surface of the main panel.

In an embodiment, the plurality of scoring marks form a series of lines substantially oriented along a lateral axis of the sleeve.

In an embodiment, the packaging further comprises a second plurality of scoring marks near the open end of the main panel and a top flap that folds over the open end and adheres to the solid back panel.

In an aspect, a telescoping box comprises first and second sleeves as described herein, wherein the open end of the first sleeve is configured to slide over the open end of the second sleeve, thereby providing an adjustable-length telescoping box.

In an embodiment, the first back panel and the second back panel of the packaging each comprise a quadrant to be folded along a substantially straight edge in-line with an interior edge of the bottom flap. In an embodiment, the top edge of each quadrant of the packaging is arcuate. In an embodiment, the quadrants of the first back panel and the second back panel of the packaging are folded inward between the main panel and the solid back panel.

In an embodiment, the bottom panel of the packaging comprises a tab extending from each side of the bottom panel. In an embodiment, the tabs of the packaging are disposed between the solid back panel and the bottom flap when the packaging is folded into a sleeve.

In an embodiment, the packaging further comprises tabs extending from each side of the bottom panel adjacent each quadrant, wherein the tabs comprise arcuate bottom edges mirroring the arcuate top edges of the quadrants, wherein the arcuate bottom edges and the arcuate top edges are not connected to one another.

In an embodiment, the first back panel of the packaging comprises a tear strip oriented along a substantially longitudinal axis of the first back panel, oriented along a substantially lateral axis of the sleeve, and/or oriented around all or part of a circumference of the sleeve.

In an embodiment, the packaging further comprises an artwork panel formed on interior surfaces of at least a portion of the main panel, the first back panel, and the second back panel.

In an embodiment, the packaging material is a rigid material, a self-supporting material and/or a substantially flat material. In an embodiment, the packaging material is selected from the group consisting of cardboard, paperboard, plastic, foam, cellulose, bamboo, particle board, or combinations thereof.

In an aspect, a method of making packaging comprises shaping and creasing material to form a main panel, a first back panel, a second back panel, and a bottom flap, folding the first back panel and the second back panel toward one another, joining the first back panel and the second back panel to form a solid back panel, folding the bottom flap, adhering the bottom flap to the solid back panel to create a sleeve having an open end and a substantially closed end, and providing a plurality of scoring marks on a surface of the main panel near the closed end, each of the scoring marks partially penetrating a thickness of the main panel.

In an aspect, a shipping sleeve comprises a front panel and a back panel, at least one of the front panel and the back panel comprising a plurality of score marks oriented substantially perpendicular to a direction of flexion, a closed end substantially sealed with a bottom flap, an open end opposite the closed end, and reinforcing material between the front panel and the back panel and between the back panel and the bottom flap.

In an embodiment, the shipping sleeve further comprises a top flap that folds over the open end and adheres to the back panel, and additional reinforcing material between the front panel and the back panel and between the back panel and the top flap.

In an embodiment, the reinforcing material of the shipping sleeve comprises a set of foldable quadrants and a set of tabs.

In an embodiment, the back panel of the shipping sleeve comprises a tear strip oriented along a substantially longitudinal axis of the back panel, oriented along a substantially lateral axis of the shipping sleeve, and/or oriented around all or part of a circumference of the shipping sleeve.

In an embodiment, the shipping sleeve further comprises an artwork panel formed on interior surfaces of at least a portion of the front panel and the back panel.

In an aspect, a telescoping box comprises first and second shipping sleeves as disclosed herein, wherein the open end of the first shipping sleeve is configured to slide over the open end of the second shipping sleeve, thereby providing an adjustable-length telescoping box.

In an aspect, a shipping sleeve comprises a front panel, a pair of back panels, and a pair of end panels, where two distinct areas of the shipping sleeve each include a plurality of score marks traversing laterally across at least the front panel and the pair of back panels. In an embodiment, each of the two areas further comprises additional score marks traversing laterally across a nearest end panel of the pair of end panels. Usually, the back panels are asymmetric in size relative to one another.

In an aspect, a storage system comprises a plurality of craddles, a plurality of divider walls each sandwiched between legs of U-shaped end pieces, and a strap surrounding the plurality of craddles and the plurality of divider walls. Each craddle has a slot formed by a pair of parallel walls, U-shaped end pieces joining ends of the parallel walls, which are elevationally offset from bottom surfaces of the U-shaped end pieces, and an opening in a bottom surface of the craddle.

In an embodiment, top surfaces of bases of the U-shaped end pieces are sloped toward the opening in the bottom surface of the craddle.

In an embodiment, craddles within the plurality of craddles at opposite ends of the storage system sandwich alternating divider walls.

In an embodiment, a length of packaging is equal to a length of a product being packaged plus a depth of the packaging.

BRIEF DESCRIPTION OF THE DRAWINGS

Illustrative embodiments of the present invention are described in detail below with reference to the attached drawings, wherein.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

“Proximal” and “distal” refer to the relative positions of two or more objects, planes or surfaces. For example, an object that is close in space to a reference point relative to the position of another object is considered proximal to the reference point, whereas an object that is further away in space from a reference point relative to the position of another object is considered distal to the reference point.

The terms “direct and indirect” describe the actions or physical positions of one object relative to another object. For example, an object that “directly” acts upon or touches another object does so without intervention from an intermediary. Contrarily, an object that “indirectly” acts upon or touches another object does so through an intermediary (e.g., a third object).

Exemplary packaging can be seen in FIGS. 1-13, which are described hereafter. Any listed dimensions are for illustrative purposes only.

Figure 1:
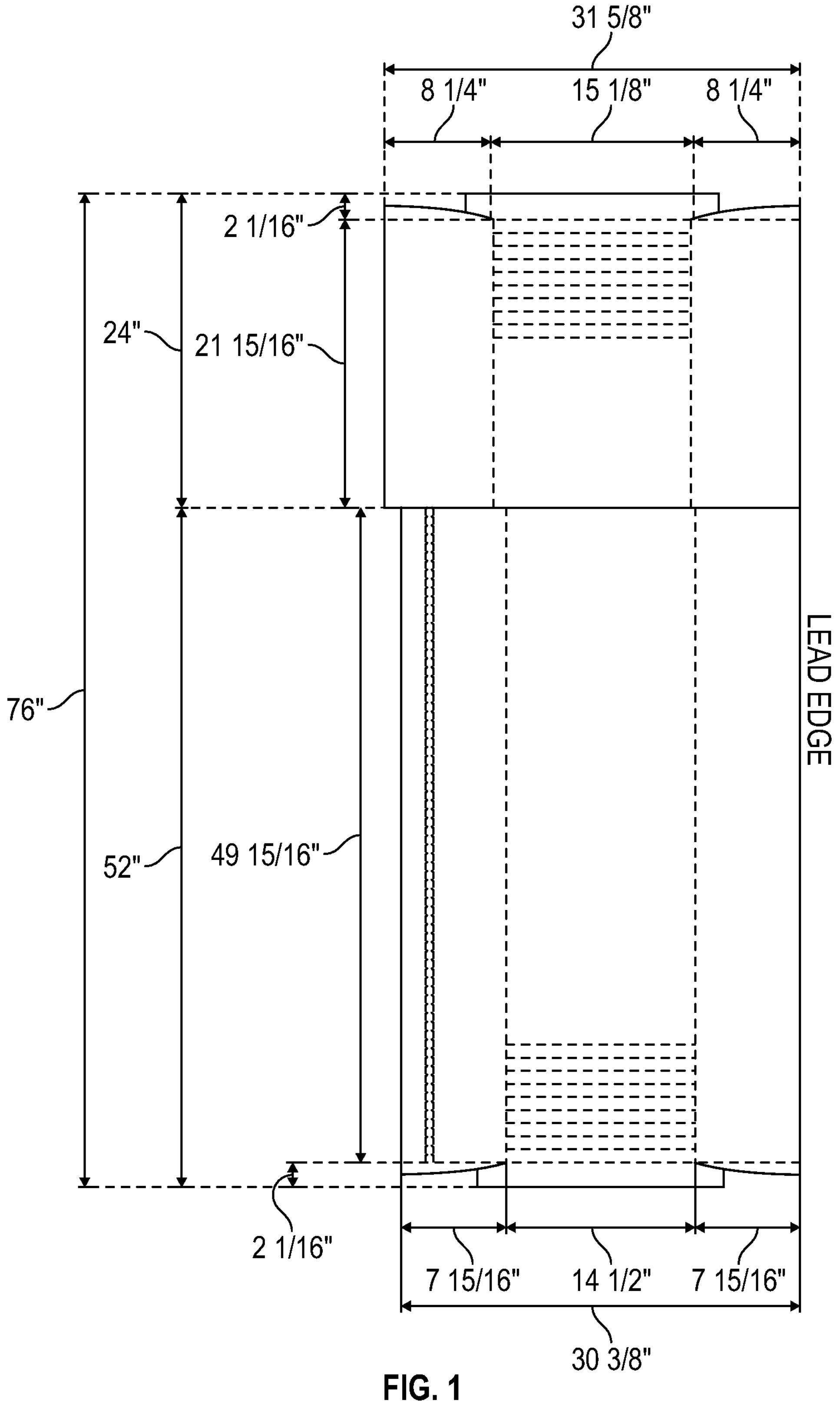
FIG. 1 is a diagram of a packaging template, according to an embodiment.

FIG. 1 is a diagram of a packaging template, according to an embodiment. Solid lines illustrate cut marks, and dashed lines illustrate scoring marks that facilitate folding or flexing. In the embodiment shown, laterally oriented scoring lines facilitate curvature at end regions of the packaging to accommodate the curved tip and tail of a snowboard. Other products may require packaging flexibility in other positions. Therefore, scoring in other locations and other patterns may be implemented in the presently disclosed packaging. As shown two sleeves may be cut from a single piece of material, with one sleeve being cut slightly wider than the other to allow the two sleeves to mate as male and female parts.

Figure 2:
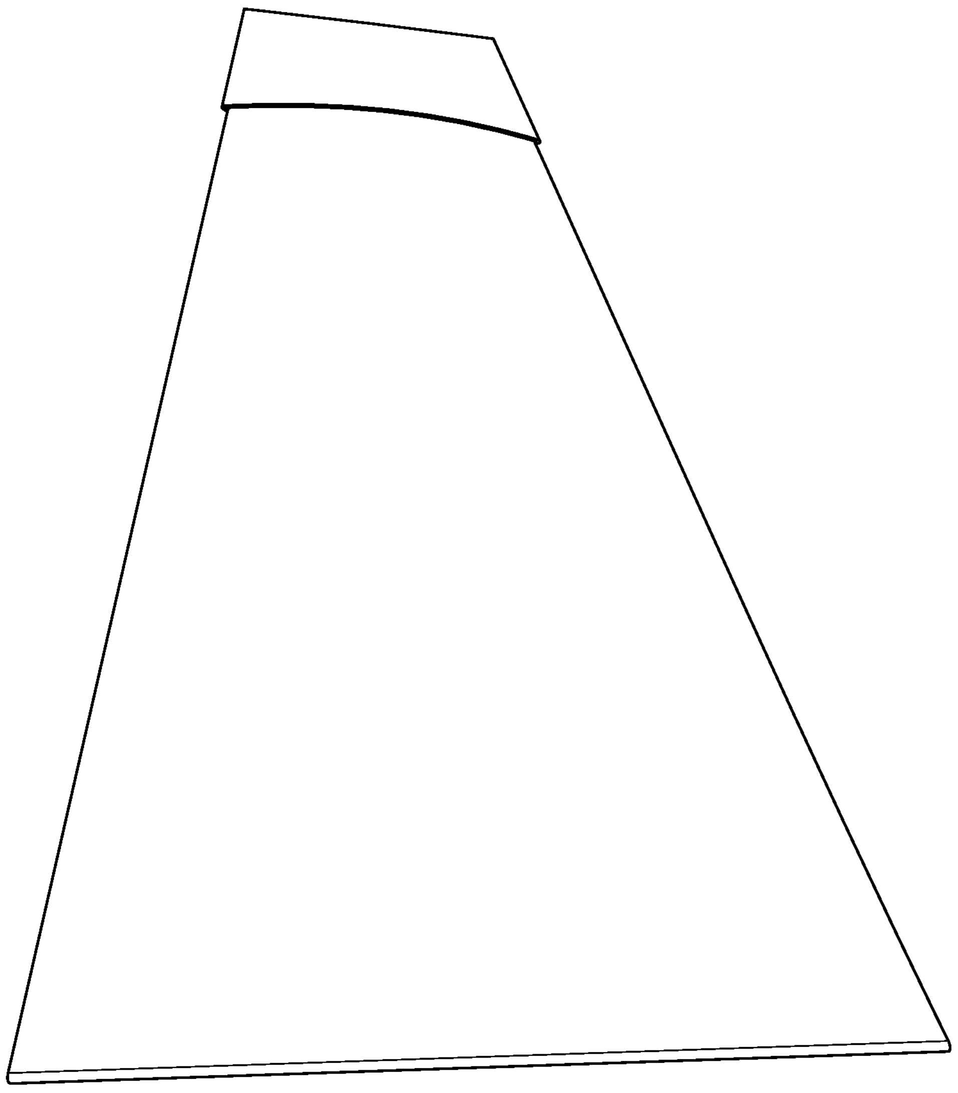
FIG. 2 is a top perspective view of packaging, according to an embodiment, in an assembled state.
Figure 3:
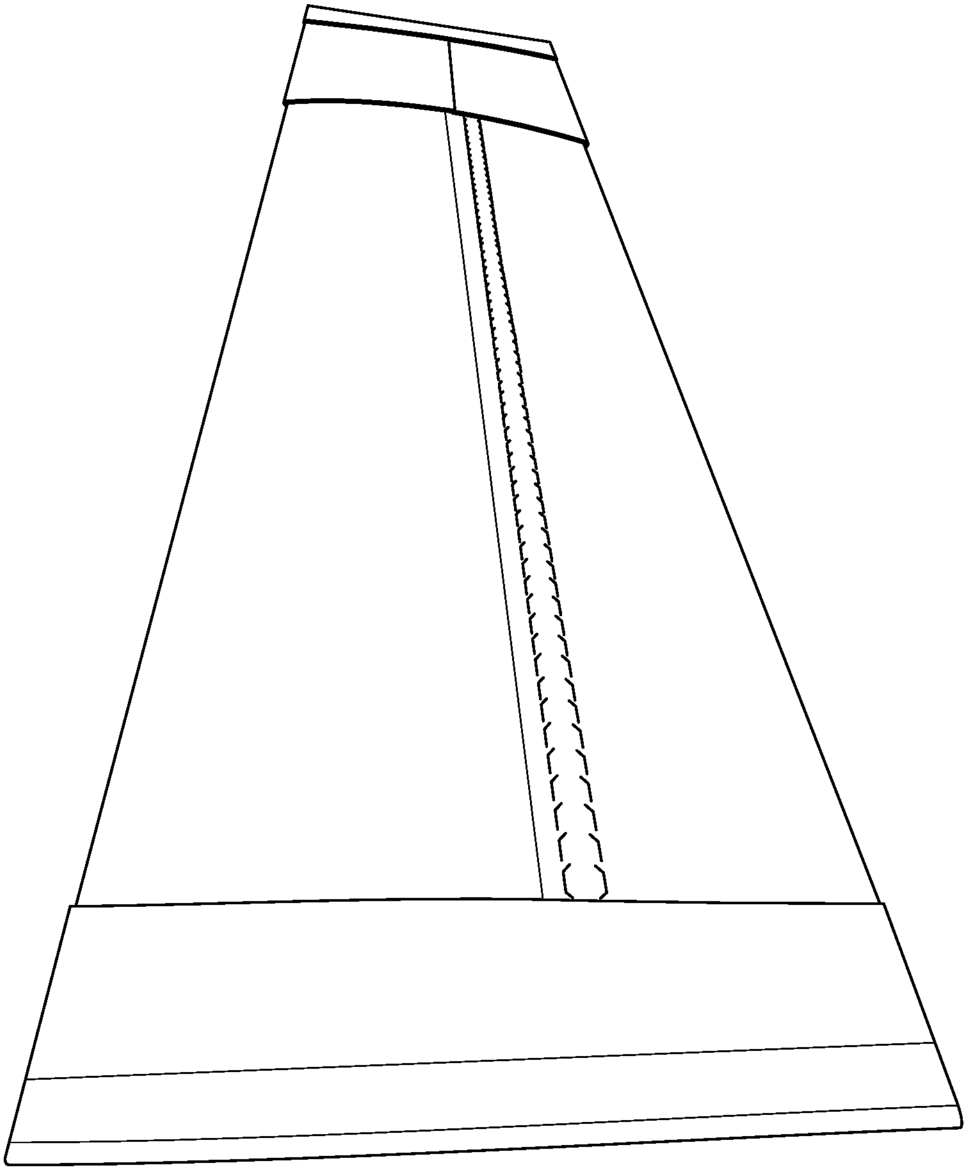
FIG. 3 is a back view of the packaging of FIG. 2.

FIG. 2 is a top perspective view of packaging, according to an embodiment, in an assembled state. FIG. 3 is a back view of the packaging of FIG. 2. A perforated tear strip can be seen on one of the back panels, which are seam sealed together.

Figure 4:
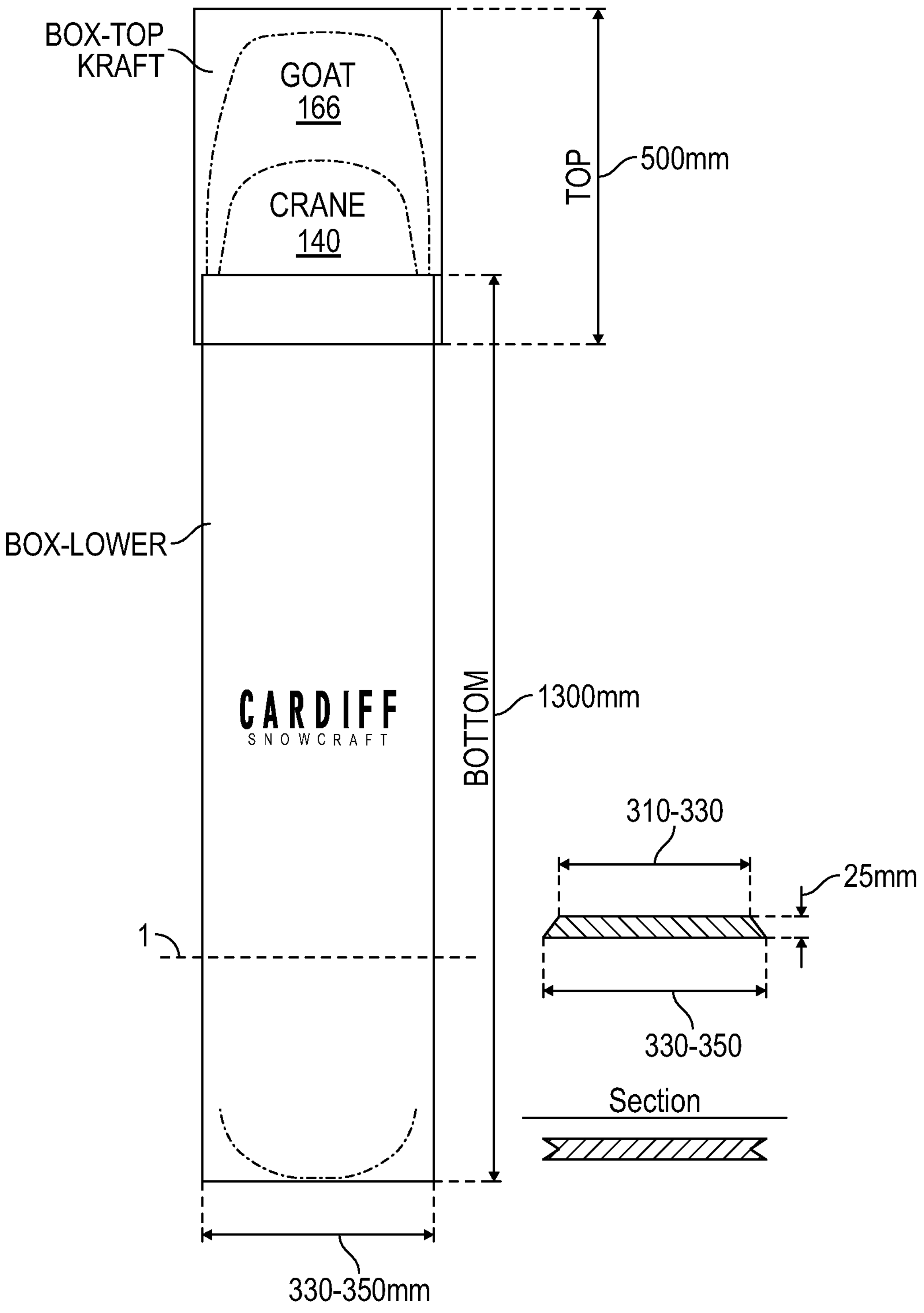
FIG. 4 is a schematic of folded packaging, according to an embodiment.

FIG. 4 is a schematic of folded packaging, according to an embodiment. An end view and a cross-sectional view through line 1 are shown on the bottom right portion of the diagram. The listed dimensions are for illustrative purposes only.

Figure 5:
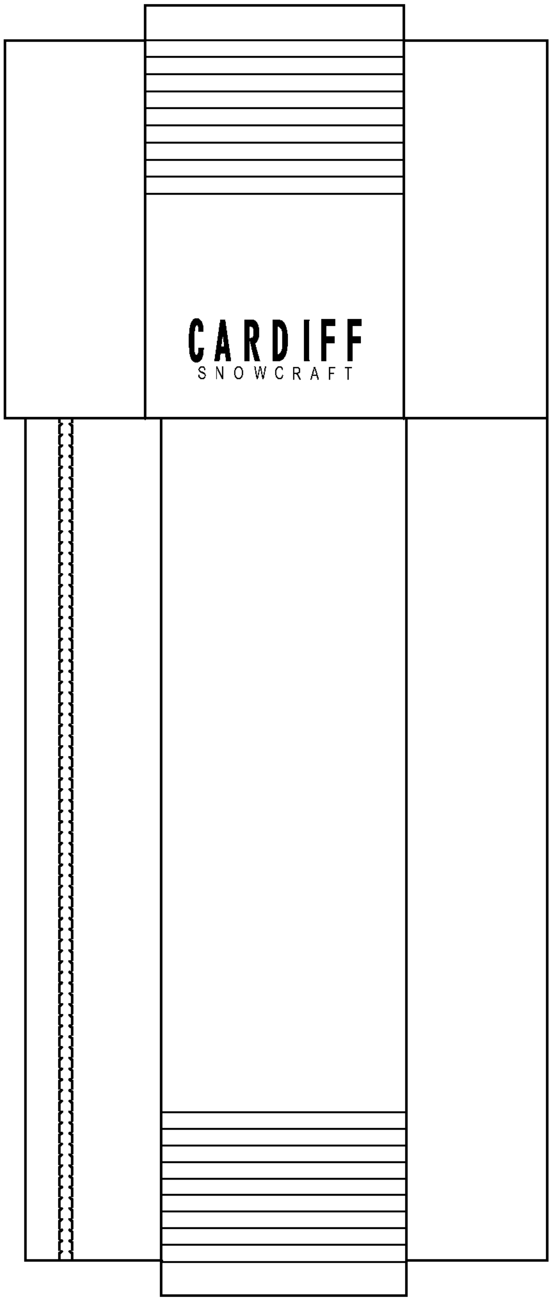
FIG. 5 is a schematic of the outside surface of a packaging template, according to an embodiment.

FIG. 5 is a schematic of the outside surface of a packaging template, according to an embodiment. Graphics are for illustrative purposes only.

Figure 6:
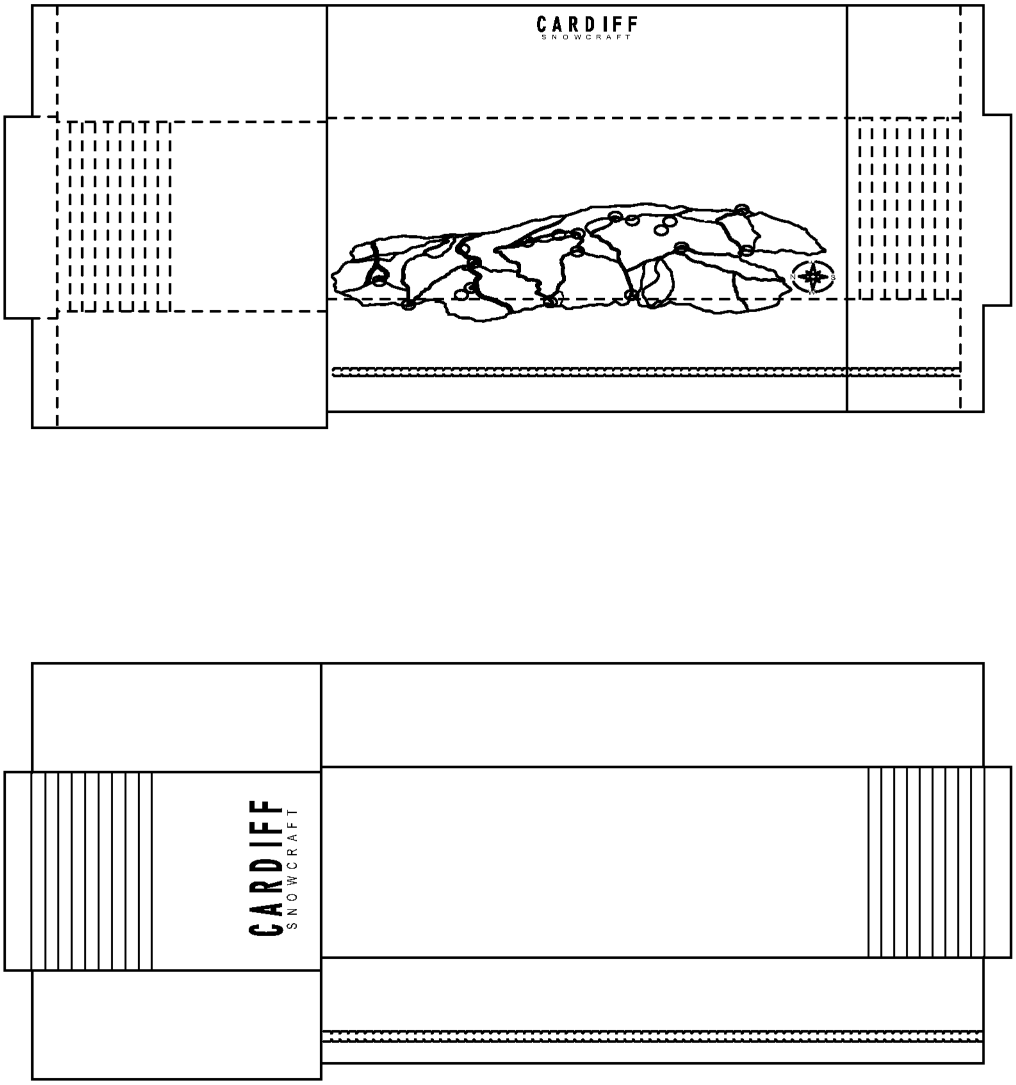
FIG. 6 is a schematic of the outside surface of the packaging shown in FIG. 5 next to artwork that may be printed on the inside of the packaging, according to an embodiment.

FIG. 6 is schematic of the outside surface of the packaging shown in FIG. 5 next to artwork that may be printed on the inside of the packaging, according to an embodiment. The artwork shown is for illustrative purposes only, and the artwork may be printed as a mirror image on the flipside of the artwork panel shown. It can be seen that the tear strip is disposed outside the artwork panel, so as not to damage the artwork when the packaging is opened.

Figure 7:
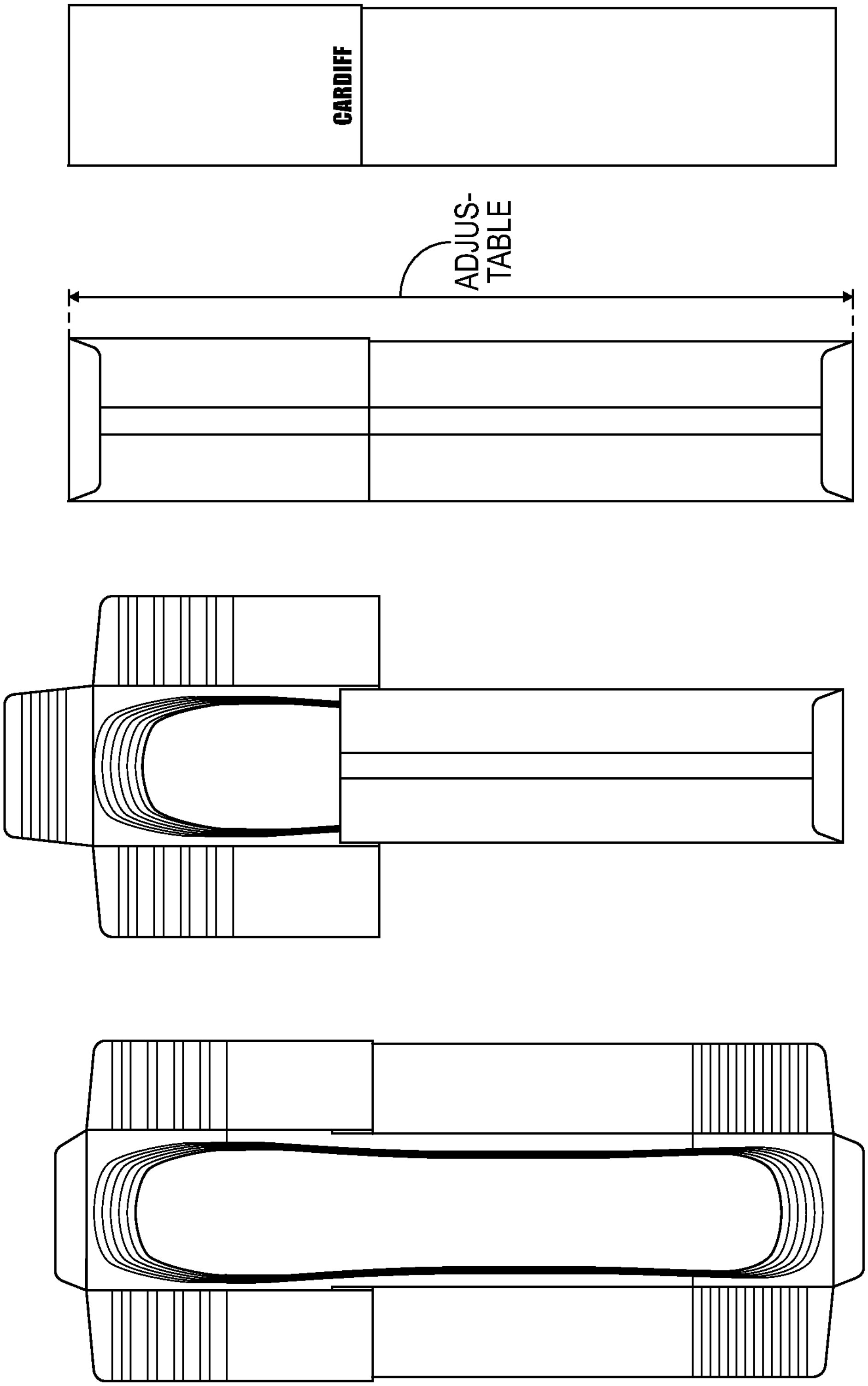
FIG. 7 is a schematic showing progressive folding steps for a telescoping box, according to an embodiment.

FIG. 7 is a schematic showing progressive folding steps for a telescoping box, according to an embodiment. In the open configuration (far left), two overlapping pieces of a telescoping box are shown with a snowboard sitting atop their main panels. First and second back panels of one piece are folded toward one another such that they overlap and adhere to one another. A bottom flap is then folded over and adhered to the back panel to create a sleeve having an open end, where the snowboard protrudes, and a substantially closed end. A plurality of scoring marks on the first and second back panels, and optionally on the main panel, near the closed end provide flexibility for the sleeve to flex substantially perpendicular to the direction of the scoring marks. This allows the packaging to conform to the curvature of the snowboard (or other three-dimensional object within the packaging). A second piece of the packaging also comprises first and second back panels having laterally oriented scoring marks and a top flap, which is optionally also scored (second from left). When the first and second back panels are folded toward one another, they create a solid back panel, and the top flap is folded over and adhered to the back panel to create a second sleeve, which is slightly wider than the first sleeve such that the two sleeves mate to form an adjustable, telescoping package capable of conforming to the length and curvature of contents within the packaging (two panels on right showing back and front surfaces). The width of the main panel may also be selected to approximate the width of the contents.

Figure 8:
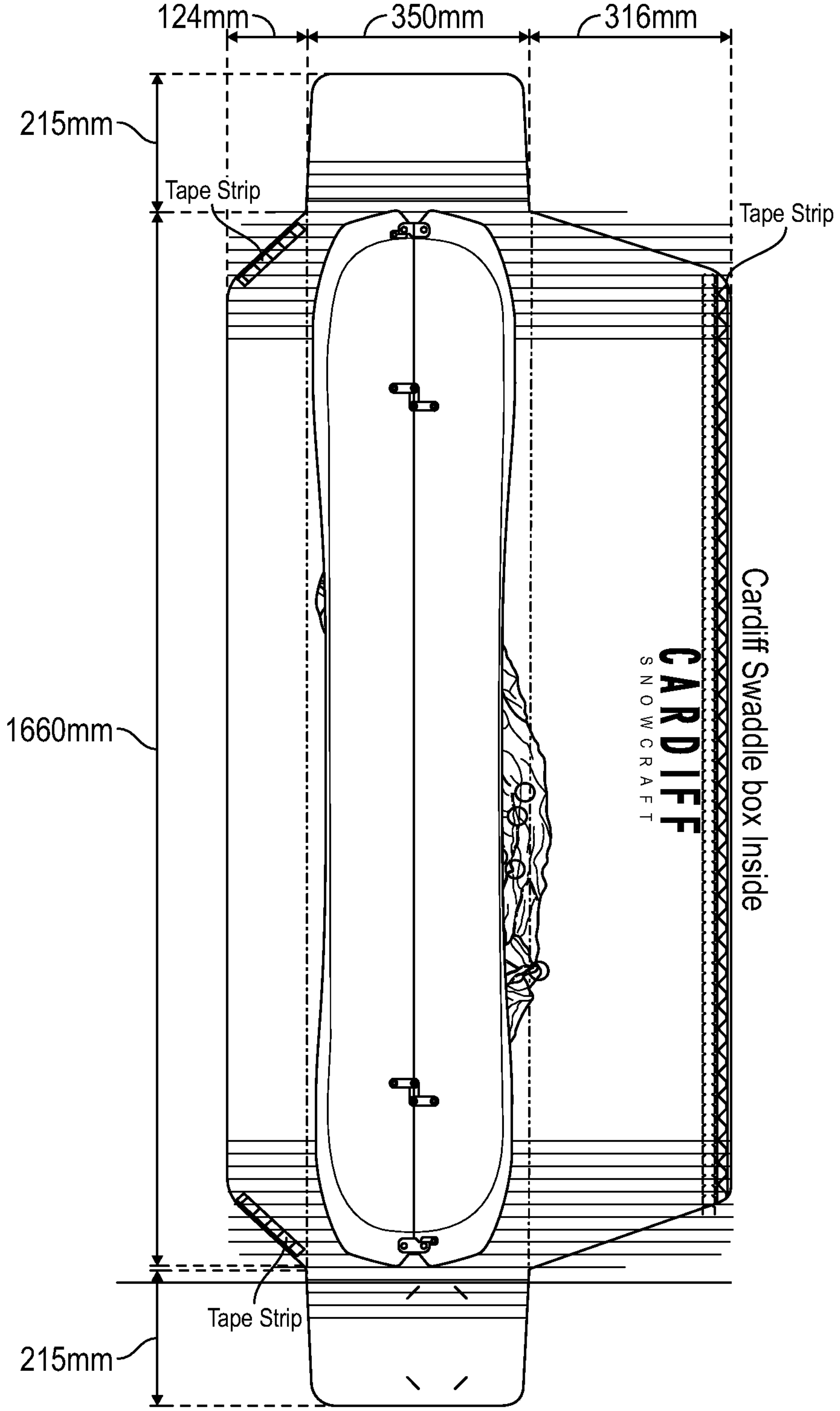
FIG. 8 is a diagram of an inside surface of a packaging template, according to an embodiment, and a snowboard to be enclosed within the packaging.
Figure 9:
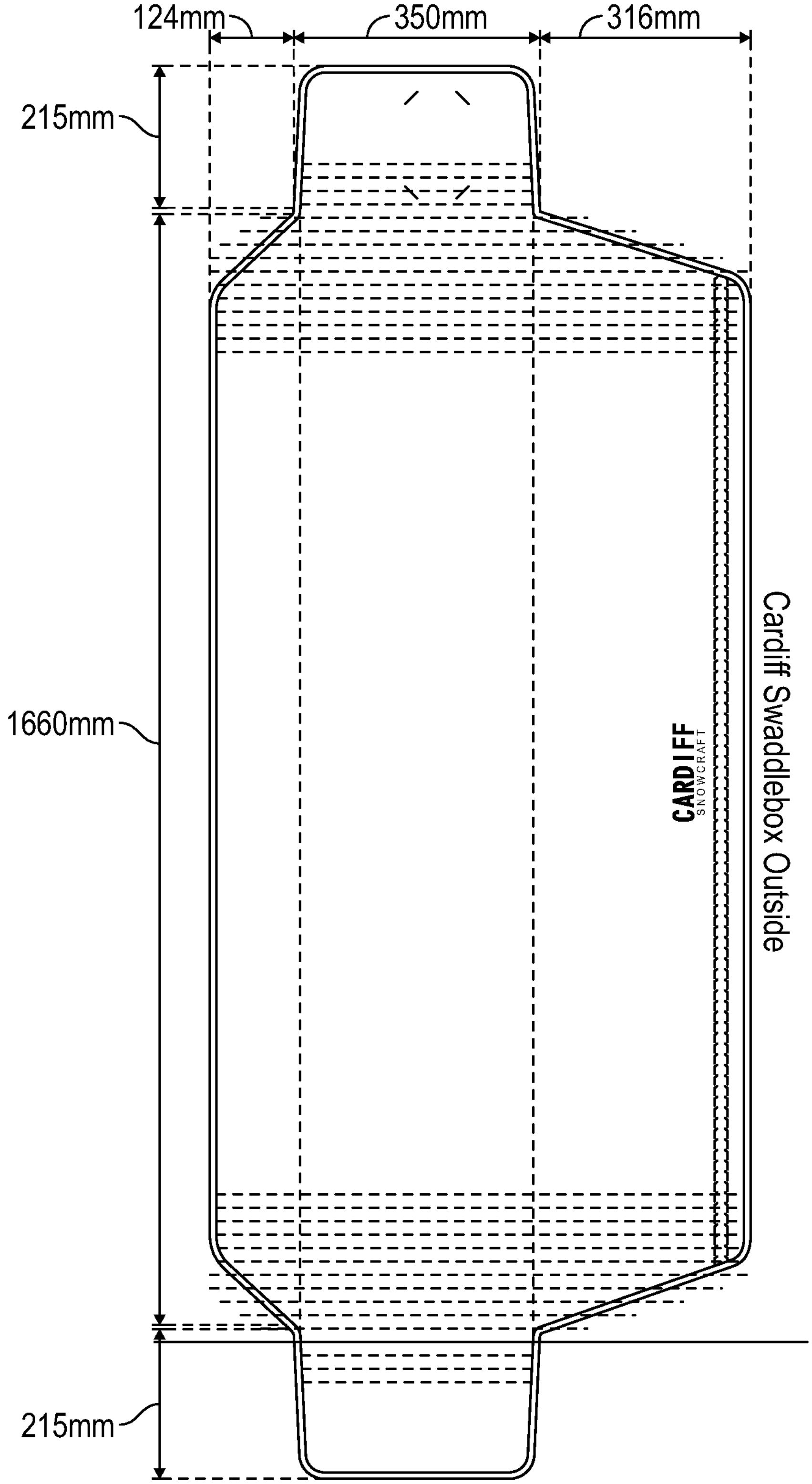
FIG. 9 is a diagram of the outside surface of the packaging template shown in FIG. 8.
Figure 10:
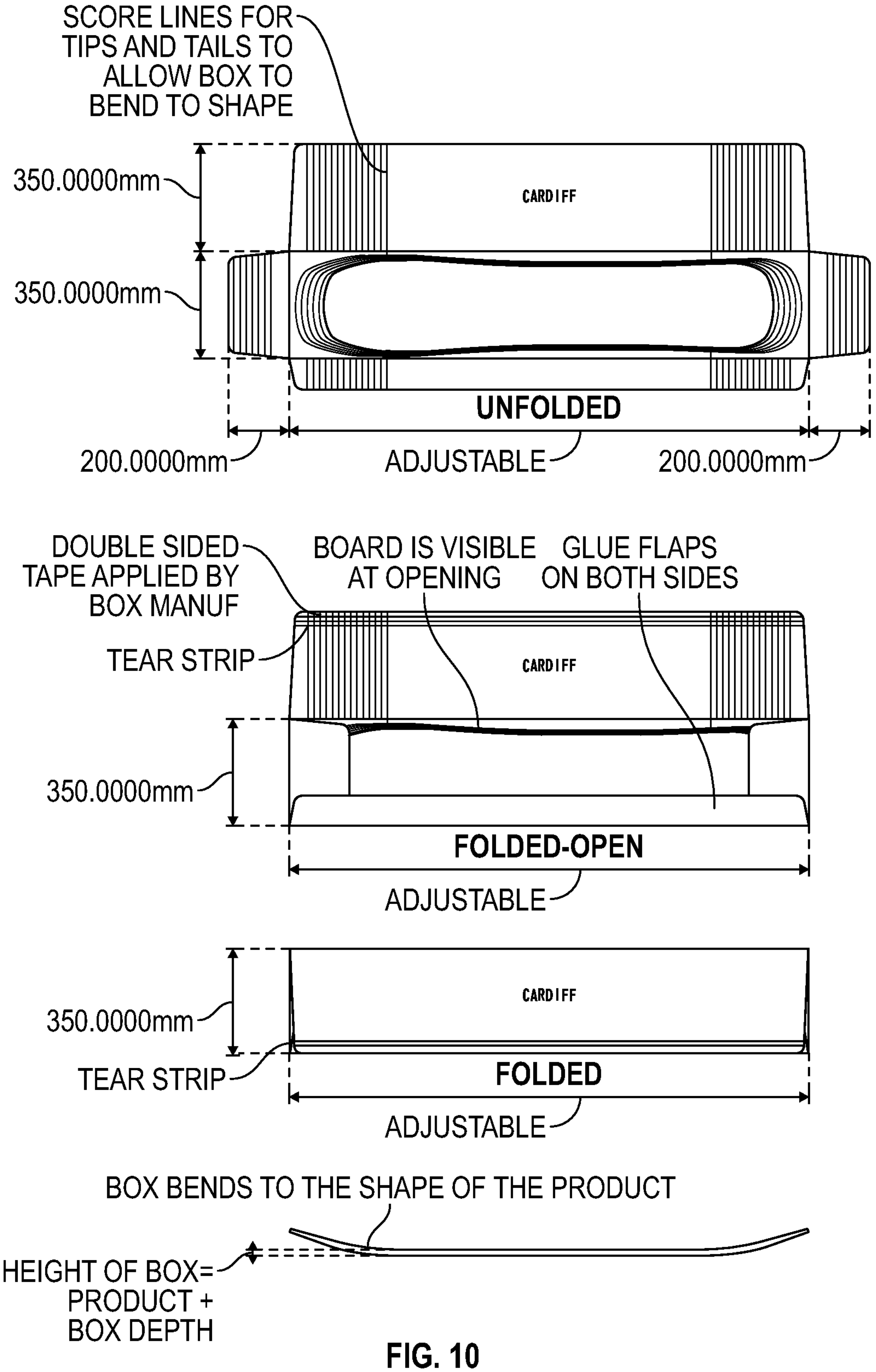
FIG. 10 is a schematic showing progressive folding steps for a swaddle box, according to an embodiment.

FIG. 8 is a diagram of an inside surface of a packaging template, according to an embodiment, and a snowboard to be enclosed within the packaging. The listed dimensions are for illustrative purposes only. Lateral lines, relative to the longitudinal axis of the packaging, illustrate scoring marks that facilitate folding or flexing. In the embodiment shown, laterally oriented scoring lines facilitate curvature perpendicular to the scoring lines at end regions of the packaging to accommodate the curved tip and tail of a snowboard. Other products may require packaging flexibility in other positions. Therefore, scoring in other locations and other patterns may be implemented in the presently disclosed packaging. As shown, back panels of the packaging are asymmetric in size relative to one another. This allows a longitudinal tear strip to be offset from a centerline of the joined back panels, thereby allowing offset printing on an interior surface of the packaging, and front and back outer surfaces that are relatively free of prominent seams. Also, as shown, the ends of each back panel are tapered in the longitudinal direction, and the end panels may be tapered in the lateral direction, to reduce packaging material. In use, the packaging is assembled by folding the end panels over the contents of the package, removing tape liners from edges of the smaller back panel, folding the smaller back panel over the end panels and adhering the smaller back panel to the end panels at each of the tape strips, then removing a tape liner from the longitudinal edge of the larger back panel, and optionally taper liners from the opposite side of the smaller back panel, and folding the larger back panel over the smaller back panel and adhering the back panels together by the tape strip(s). FIG. 9 is a diagram of the outside surface of the packaging template shown in FIG. 8. FIG. 10 is a schematic showing progressive folding steps for packaging similar to that shown in FIGS. 8 and 9.

Figure 11:
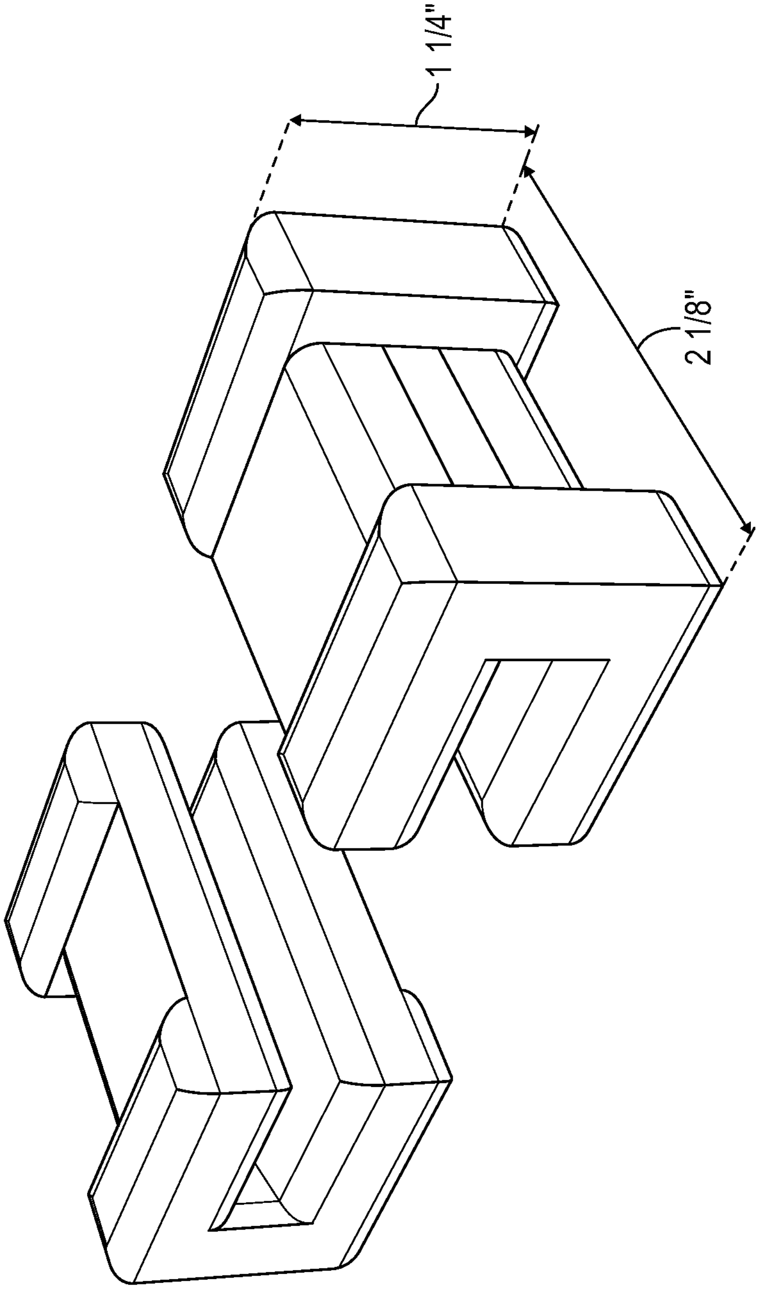
FIG. 11 is a schematic showing a craddle for a storage system from multiple angles.

FIG. 11 is a schematic showing a craddle for a storage system from multiple angles. The craddle comprises a slot formed by a pair of parallel walls with U-shaped end pieces joining ends of the parallel walls. The U-shaped end pieces are aligned in the same direction as one another to allow a divider wall to slide into the slot. A bottom surface of the craddle comprises an opening defined by the parallel walls and end pieces. Because bottom surfaces of the parallel walls are elevationally offset from bottom surfaces of the U-shaped end pieces, moisture can be drawn away from the craddle in two dimensions (e.g., down and out).

Figure 12:
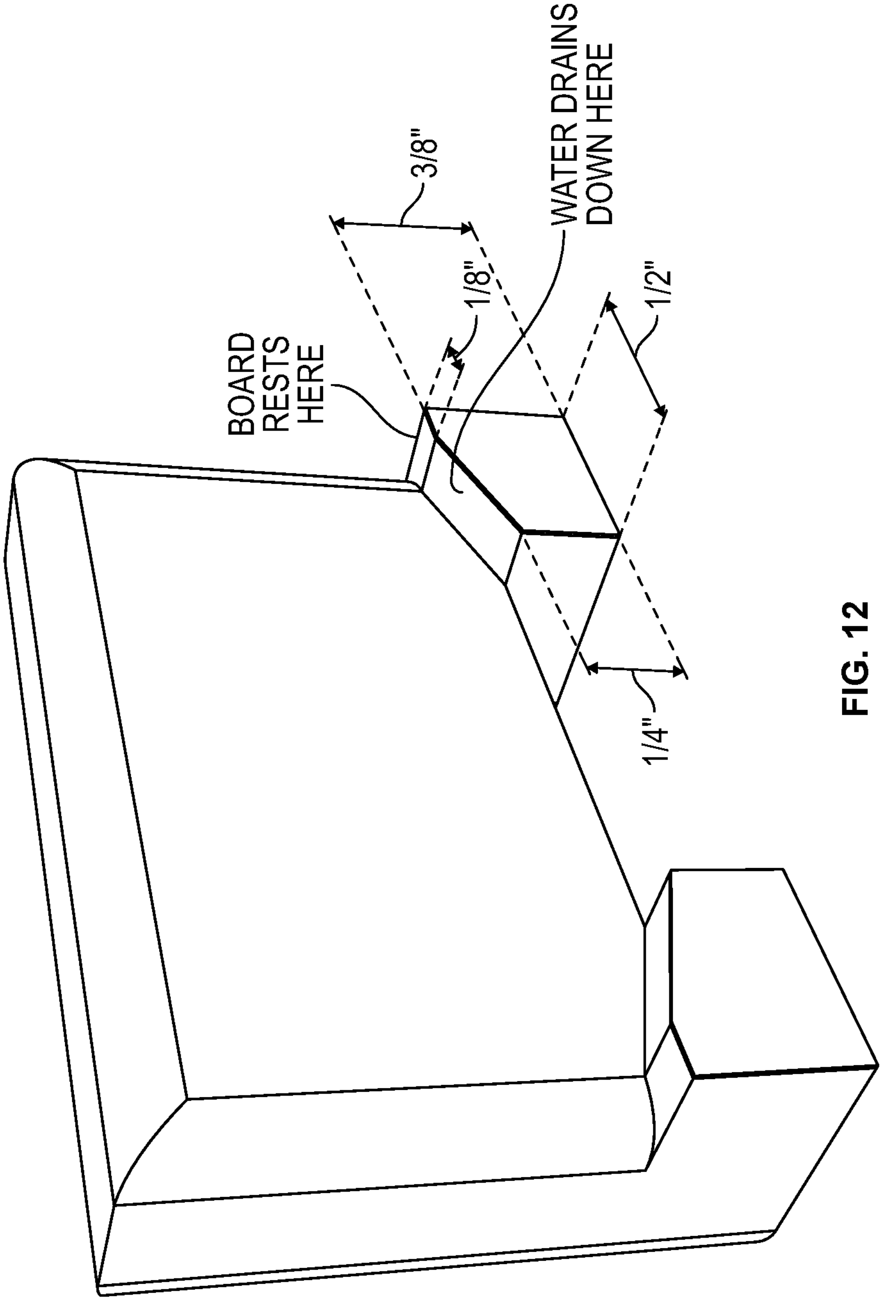
FIG. 12 is a cross section of the craddle of FIG. 11.

FIG. 12 is a cross section of the craddle of FIG. 11 showing that top surfaces of the bases of the U-shaped end pieces provide small resting surfaces parallel to the bottom surface of the craddle. The remaining portion of the top surfaces of the bases of the U-shaped end pieces are sloped or beveled toward the opening in the craddle to allow for water drainage. When the items being stored are snowboards, the small resting surfaces minimize contact between snowboard edges and the craddles, thereby minimizing areas where rust would be prone to developing. Additional openings or drainage channels, which may or may not be connected to the opening in the bottom of the craddle, may be present to allow for water drainage when the storage system rests in alternative orientations. For example, when divider walls and/or products are oriented parallel to the ground, openings with through-axes angled toward the ground may be made through the bases of the U-shaped end pieces and/or parallel walls.

Although the storage systems have been disclosed as useful for the storage, transport, and shipping of snowboards, other items, such as glass panes, construction materials, solar panels, and the like, may be held by the storage systems.

The craddle may be modular or a unitary body. Exemplary techniques for making the craddle include, but are not limited to, additive manufacturing, subtractive manufacturing, computer numerical control (CNC) machining, blow molding, and injection molding. The craddle may, for example, be made of high density foam that provides rigidity and impact resistance.

Figure 13:
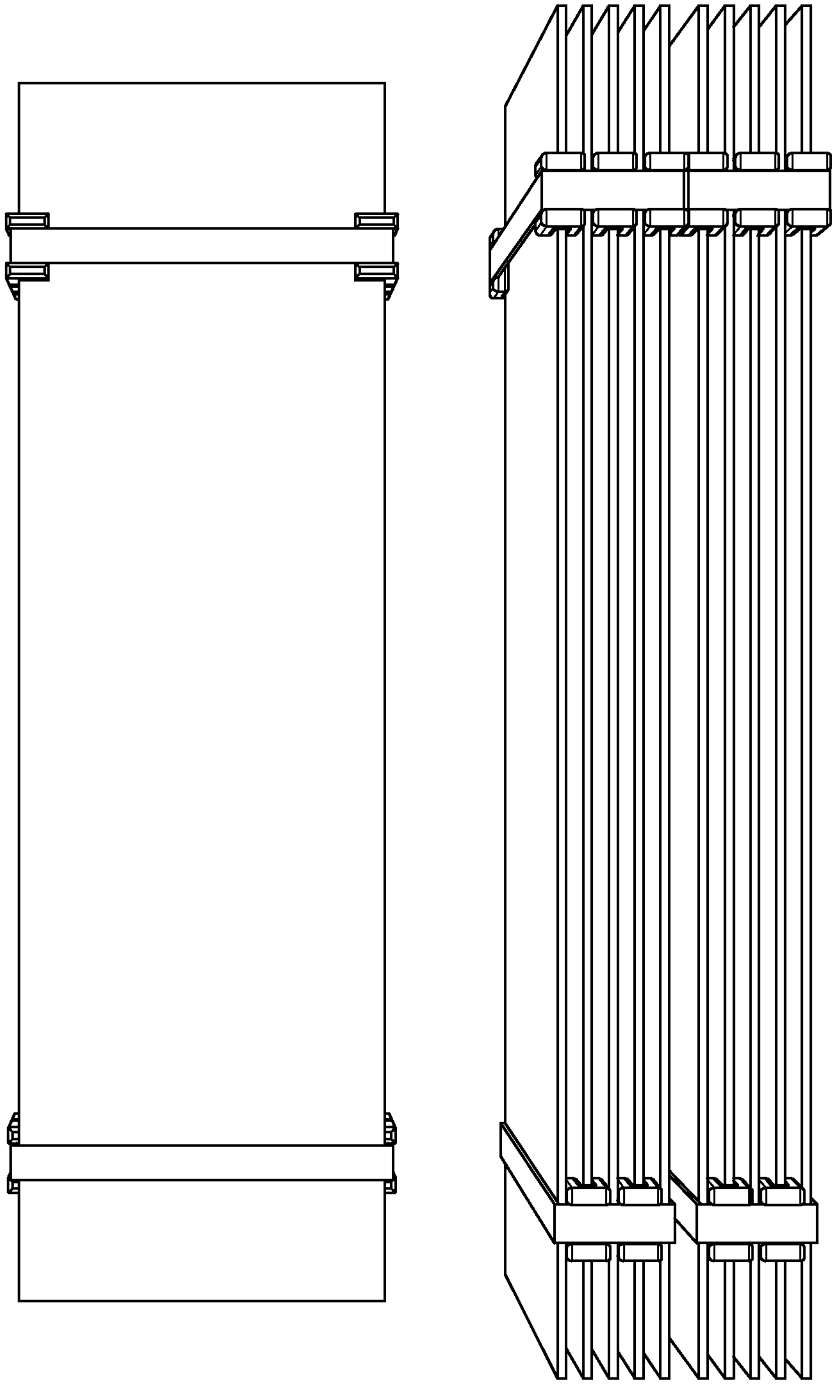
FIG. 13 is a schematic showing top and side views of an assembled storage system incorporating a plurality of the craddles of FIGS. 11 and 12.

FIG. 13 is a schematic showing top (left) and side (right) views of an assembled storage system incorporating a plurality of the craddles of FIGS. 11 and 12. The side view shows how multiple craddles and divider walls may be assembled into a storage system for items to be held between the divider walls. As shown, craddles at opposite ends of the storage system are staggered such that the legs of a first craddle sandwich a first divider at a first end of the storage system and the legs of a second craddle sandwich a second divider at a second end of the storage system, and so forth. All of the craddles at an end of the storage system are then strapped together, ideally with a strap having a width approximately equal to the width between the bases of the U-shaped end pieces of a craddle. In an embodiment, a plurality of small storage systems can be strapped together into a larger storage system. Thus, storage systems disclosed herein can be tailored to accommodate as many dividers or items as necessary. In some embodiments, additional craddles may be added at a mid-point, or other location, along the storage system to provide additional rigidity (e.g., when relatively long divider walls might otherwise flex or bow).

In an embodiment of the storage system, divider walls are replaced by items to be stored or shipped (e.g., snowboards, skis, glass panes, solar panels, etc.) such that the craddles are attached directly to edges of the items and a strap optionally secures the craddles and items together.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods and devices useful for the present methods and devices can include a large number of optional composition and processing elements and steps.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a tab" includes a plurality of such tabs and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described. Nothing herein is to be construed as an admission that the invention is not entitled to antedate such disclosure by virtue of prior invention.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements or limitation or limitations which is/are not specifically disclosed herein.

All art-known functional equivalents of materials and methods are intended to be included in this disclosure. The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A shipping sleeve comprising:
a front panel;
a pair of back panels each having an inner edge shared with the front panel and an outer edge opposite the inner edge;
a pair of end panels; and
two distinct areas of the shipping sleeve comprising a plurality of score marks that traverse from the outer edge of one of the pair of back panels, across the front panel, to the outer edge of another of the pair of back panels.

2. The shipping sleeve of claim 1 further comprising additional pluralities of score marks traversing across each of the end panels.

3. The shipping sleeve of claim 1, wherein the back panels are asymmetric in size relative to one another.

4. The shipping sleeve of claim 1, wherein the score marks partially penetrate an interior surface of the front panel.

5. The shipping sleeve of claim 1, wherein the score marks partially penetrate an exterior surface of the front panel.

6. The shipping sleeve of claim 1, wherein the score marks partially penetrate both an interior surface and an exterior surface of the front panel.

7. The shipping sleeve of claim 1, wherein the plurality of score marks forms a series of lines.

8. The shipping sleeve of claim 1, wherein one of the back panels comprises a tear strip oriented along its longitudinal axis.

9. The shipping sleeve of claim 1 further comprising an artwork panel formed on interior surfaces of the front panel and at least one of the pair of back panels.

10. The shipping sleeve of claim 1, wherein the shipping sleeve is made of a material that is a rigid material, a self-supporting material and/or a flat material.

11. The shipping sleeve of claim 1, wherein the shipping sleeve is made of a material that is selected from the group consisting of cardboard, paperboard, plastic, foam, cellulose, bamboo, particle board, or combinations thereof.

12. The shipping sleeve of claim 1 further comprising adhesive strips on interior surfaces of both of the pair of back panels.

13. A method of making a shipping sleeve, the method comprising:

shaping and creasing material to form a front panel, a pair of back panels each having an inner edge shared with the front panel and an outer edge opposite the inner edge, and a pair of end panels; and providing two distinct areas of the shipping sleeve comprising a plurality of score marks that traverse from the outer edge of one of the pair of back panels, across the front panel, to the outer edge of another of the pair of back panels.

14. The method of claim 13 further comprising providing additional pluralities of score marks traversing across each of the end panels.

15. The method of claim 13 further comprising providing artwork on interior surfaces of the front panel and at least one of the pair of back panels.

16. The method of claim 13 further comprising providing adhesive strips on interior surfaces of both of the pair of back panels.

17. The method of claim 13 further comprising providing a tear strip along a longitudinal axis of one of the back panels.

18. The method of claim 13, wherein the score marks partially penetrate a thickness of the front panel.

19. The method of claim 13, wherein the plurality of score marks forms a series of lines.

20. The method of claim 13 further comprising closing the shipping sleeve by:

folding the pair of end panels toward one another;

adhering one of the pair of back panels to the pair of end panels in their folded state; and adhering another of the pair of back panels to the one back panel previously adhered to the pair of end panels.

* * * * *